(12) United States Patent
Fischer et al.

(10) Patent No.: US 9,201,938 B2
(45) Date of Patent: Dec. 1, 2015

(54) PARAMETER DRIVEN DATA FORMAT CONVERSION IN CLIENT/SERVER ARCHITECTURES

(75) Inventors: Martin Fischer, Heidelberg (DE); Olaf Schmidt, Walldorf (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 13/476,996

(22) Filed: May 21, 2012

(65) Prior Publication Data

US 2013/0311546 A1    Nov. 21, 2013

(51) Int. Cl.
 H04L 29/06    (2006.01)
 H04L 29/08    (2006.01)
 G06F 17/30    (2006.01)

(52) U.S. Cl.
 CPC .......... *G06F 17/30569* (2013.01); *H04L 67/00* (2013.01); *H04L 67/08* (2013.01); *H04L 67/2823* (2013.01); *G06F 17/30076* (2013.01)

(58) Field of Classification Search
 None
 See application file for complete search history.

(56) References Cited

U.S. PATENT DOCUMENTS

| | | | | |
|---|---|---|---|---|
| 5,848,415 | A * | 12/1998 | Guck | 707/831 |
| 5,987,228 | A * | 11/1999 | Nishizawa | 358/1.15 |
| 7,254,636 | B1 * | 8/2007 | O'Toole et al. | 709/230 |
| 7,275,046 | B1 * | 9/2007 | Tritt et al. | 705/36 R |
| 7,366,751 | B2 * | 4/2008 | Ishibashi et al. | 709/201 |
| 7,689,580 | B2 * | 3/2010 | Wang et al. | 707/999.102 |
| 7,739,407 | B1 * | 6/2010 | Pakkala | 709/246 |
| 8,170,189 | B2 * | 5/2012 | Alperin et al. | 379/142.14 |
| 8,214,469 | B2 * | 7/2012 | Alperin et al. | 709/221 |
| 8,504,660 | B2 * | 8/2013 | DeCusatis et al. | 709/220 |
| 2002/0109704 | A1 * | 8/2002 | Rajarajan et al. | 345/619 |
| 2003/0009476 | A1 * | 1/2003 | Fomenko et al. | 707/103 R |
| 2003/0140043 | A1 * | 7/2003 | Hotchkiss et al. | 707/10 |
| 2004/0107182 | A1 * | 6/2004 | Yoshida | 707/1 |
| 2004/0205731 | A1 * | 10/2004 | Junkermann | 717/136 |
| 2004/0230602 | A1 * | 11/2004 | Doddington | 707/102 |
| 2005/0177589 | A1 * | 8/2005 | Venkatesh et al. | 707/102 |
| 2006/0067209 | A1 * | 3/2006 | Sheehan et al. | 370/216 |
| 2006/0230148 | A1 * | 10/2006 | Forecast et al. | 709/226 |
| 2006/0251125 | A1 * | 11/2006 | Goring et al. | 370/503 |
| 2006/0276209 | A1 * | 12/2006 | Neves et al. | 455/466 |
| 2007/0038687 | A1 * | 2/2007 | Carroll et al. | 707/204 |
| 2007/0061394 | A1 * | 3/2007 | Frid-Nielsen et al. | 709/202 |
| 2008/0016516 | A1 * | 1/2008 | Brunswig et al. | 719/315 |
| 2008/0082589 | A1 * | 4/2008 | English et al. | 707/203 |
| 2009/0099982 | A1 * | 4/2009 | Heuler et al. | 706/11 |
| 2009/0100344 | A1 * | 4/2009 | Heuler et al. | 715/733 |
| 2011/0047057 | A1 * | 2/2011 | Tritt et al. | 705/35 |
| 2011/0126134 | A1 * | 5/2011 | Macken | 715/760 |
| 2011/0224974 | A1 * | 9/2011 | Davis et al. | 704/201 |
| 2013/0275557 | A1 * | 10/2013 | Myers et al. | 709/219 |

* cited by examiner

*Primary Examiner* — Ario Etienne
*Assistant Examiner* — Ho Shiu
(74) *Attorney, Agent, or Firm* — Mintz Levin Cohn Ferris Glovsky and Popeo P.C.

(57) ABSTRACT

A system and method for parameter driven data format conversion in a client/server architecture are disclosed. A format conversion framework is provided in a protocol layer between the client and the server. The format conversion framework passes a format conversion identifier (ID) with a request from the client from the client to the server. A conversion module is looked up by the format conversion framework based on the format conversion ID, the conversion module providing a conversion routine. The format conversion framework then executes the conversion routine on a result returned from the server to the client based on the request, the conversion routine converting a format of the result into a format used by the client.

15 Claims, 3 Drawing Sheets

PARAMETER DRIVEN DATA FORMAT CONVERSION IN CLIENT/SERVER ARCHITECTURES

TECHNICAL FIELD

The subject matter described herein relates to client/server architectures, and more particularly to parameter driven data format conversion in client/server architectures.

BACKGROUND

In the context of applications running in a client server environment, there is often a need to convert structured business data from an internal server side format into an external client side format for read scenarios, and vice versa for write scenarios. Note that there are different consumption scenarios on the client side (e.g. for mobile devices or Web UIs) which have an impact on the structure of the requested business data by the client (e.g. complex hierarchically structured server-side data that is supposed to be displayed on devices with limited graphical functionality).

Simple examples include conversion of time/date information, or conversion of currencies. More complex conversions have to be done for table-like structures or hierarchical (deep nested) structures, which have a proprietary internal format on the server side, and are to be converted into one or more various external formats like RSS, XML, JSON or ODATA for client side consumption.

Current server applications expose the data values of structured business data in one fixed format, which might not meet the requirements of certain clients. A common solution to this problem is to implement some logic in the client to adjust this data format to a desired format.

With the present emergence of cloud based technologies and mobile business scenarios with short innovation cycles, there is a need for a decoupling of the core service implementations from the client side consumption of business data. Thus, there is a growing need to shift control over the data format into the service calls, and to enable different clients to be configured differently to be able to consume the services directly without any adjustments.

SUMMARY

In one aspect, a system and method provides a solution to enable client side control regarding the data exposed by a particular service (format as well as structure). This allows a better decoupling of service implementation and consumption by client applications. A method for parameter driven data format conversion in a client/server architecture includes the steps of providing a format conversion framework in a protocol layer between the client and the server, and passing, by the format conversion framework from the client to the server, a format conversion identifier (ID) with a request from the client. The method further includes looking up a conversion module by the format conversion framework based on the format conversion ID, the conversion module providing a conversion routine. The method further includes executing, by the format conversion framework, the conversion routine on a result returned from the server to the client based on the request, the conversion routine converting a format of the result into a format used by the client.

In another aspect, a system for parameter driven data format conversion in a client/server architecture includes a protocol handler at the server that handles a result from the server based on a request from the client, the result being provided according to a server protocol. The system further includes a format conversion framework provided between the client and the server. The format conversion framework includes a format conversion registry that stores a plurality of conversion identifiers (IDs) that specifies a conversion routine needed for the request from the client, a format converter interface that calculates a format conversion registered according to one of the plurality of conversion identifiers, and a format converter handler. The format converter handler communicates with the protocol handler to look up a conversion module from a plurality of conversion modules that specify executable conversion routines, the format converter handler executing the conversion routine from the conversion module on the result from the server needed for the request from the client.

This invention provides a solution to have a client side control over the structuring and the formatting of data exposed by a consumed service. This allows to use out of the box clients and supports better decoupling of service and client applications. The invention introduces the possibility to control the format conversion from the calling client and allows to add new format conversions on the server. It enables to have a different format of data for different clients for the same service on the server.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a system and method for parameter driven data format conversion in client/server architectures.

In typical cloud based scenarios, clients-server communication is based on standard protocols like HTTP. These protocols support the transfer of data between client applications and server side services, whereby parameters are utilized to specify service request. In some implementations, a new parameter is introduced to control data format conversions in the protocol layer between client and server. The actual format conversion is performed by a format conversion framework.

The new parameter is a format conversion ID, which is passed from client to server. On server-side, the parameter is evaluated and the corresponding format conversion routines defined by the format conversion ID are processed for incoming requests and outgoing results.

Figure 1:
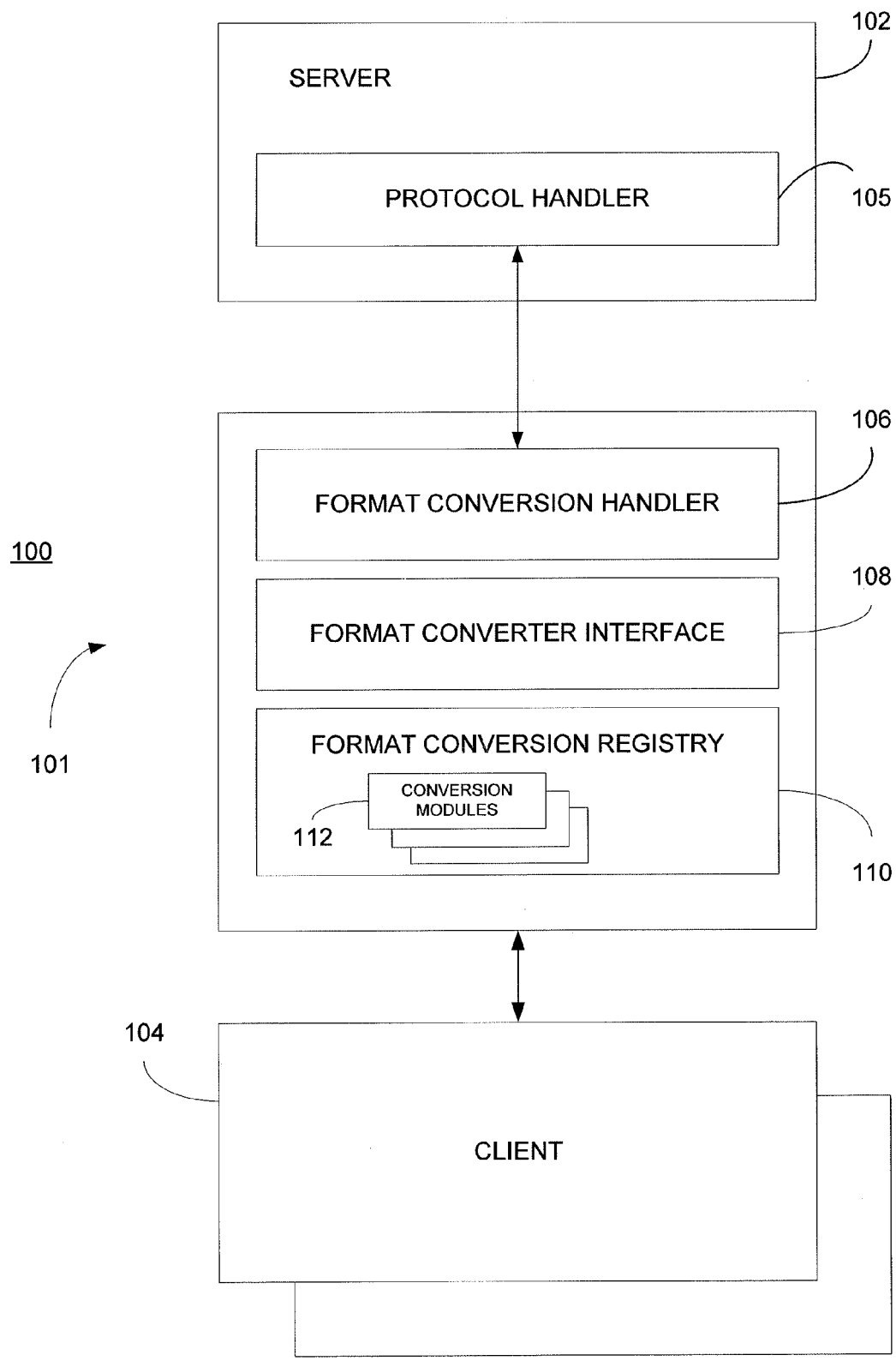
FIG. 1 is a diagram illustrating aspects of a system showing features consistent with implementations of the current subject matter.

FIG. 1 is a block diagram of a client/server architecture 100 including a format conversion framework 101 between a server 102 and one or more clients 104. The format conversion framework 101 includes a format conversion registry 110. In the format conversion registry 110, the format conversion IDs are stored together with corresponding conversion modules 112 which are responsible to execute the format conversion from internal server side format into external client side format, and inversely.

The format conversion framework 101 further includes a format converter interface 108 and implementations. The calculation of the format conversions is done by implementations of a format converter interface 108 defining the modules and signature for the conversions. With these features, the framework is extensible for new conversions, which can be registered under a unique format conversion ID in the format conversion registry 110.

The format conversion framework 101 further includes a format conversion handler 106, which communicates with a central protocol handler 105, which is the central point of the server where incoming requests and outgoing responses of the protocol are processed. Incoming format conversion IDs are passed to the protocol handler 105, and outgoing data is centrally passed to the format conversion handler 106 by the protocol handler 105. The format conversion handler 106 looks up the conversion modules in the format conversion registry 110 with the passed format conversion IDs and triggers these modules to calculate the converted format for the past format conversion IDs. With the format conversion framework 101 and client/server architecture 100 in mind, read and write processes will now be described.

Figure 2:
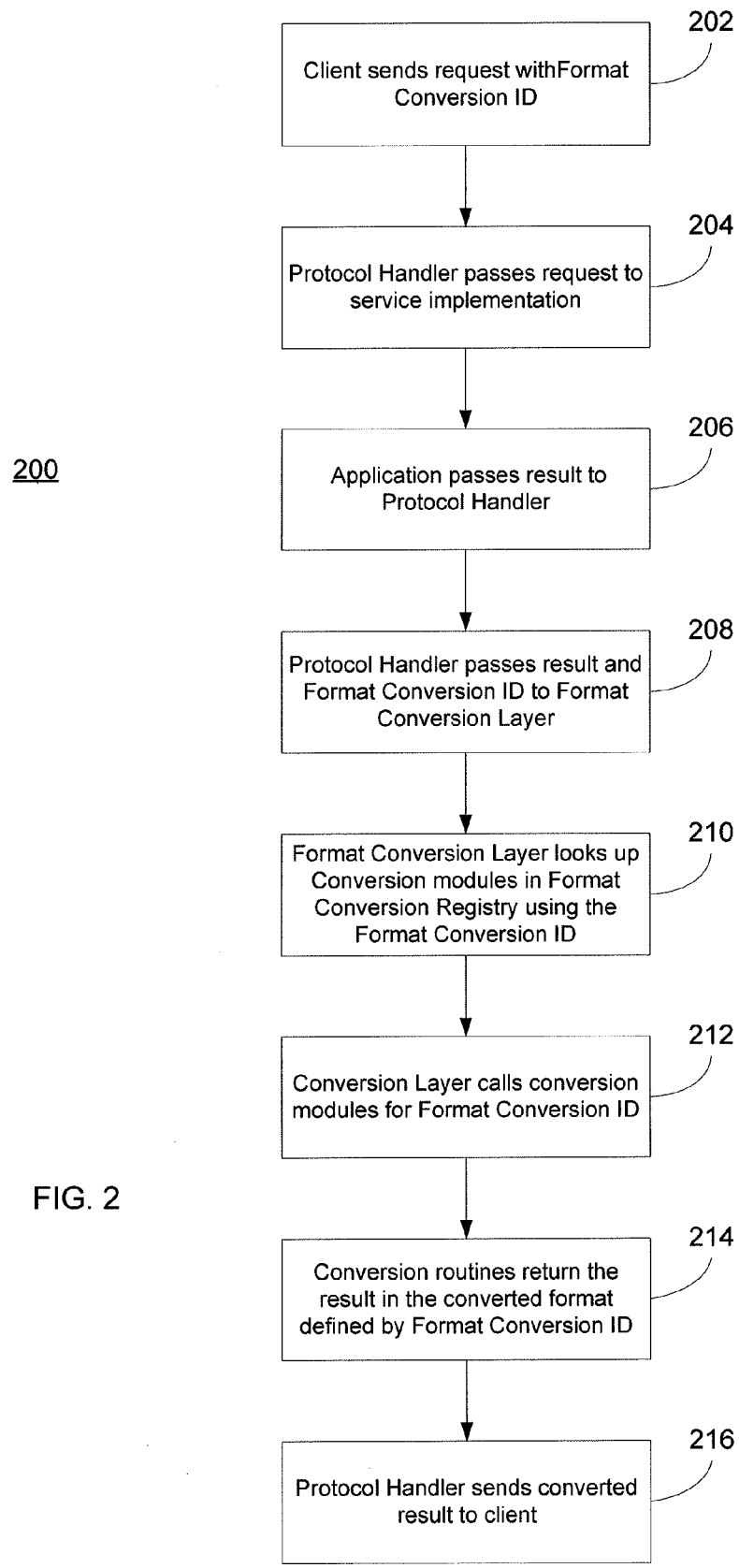
FIG. 2 is a process flow diagram illustrating aspects of a read access method having one or more features consistent with implementations of the current subject matter.

FIG. 2 is a flowchart of a read access process 200 in accordance with a parameter driven data format conversion method. At 202, a client sends a request with a format conversion ID. At 204, the protocol handler passes the request to a service implementation. At 206, the application passes the result to the protocol handler, and at 208 the protocol handler passes the result and the format conversion ID to the format conversion layer.

At 210, the format conversion layer looks up conversion modules in the format conversion registry using the format conversion ID. At 212, the conversion layer calls the conversion modules for the format conversion ID. At 214, conversion routines return the result in the converted format defined by the format conversion ID. At 216, the protocol handler sends the converted result to the client.

Figure 3:
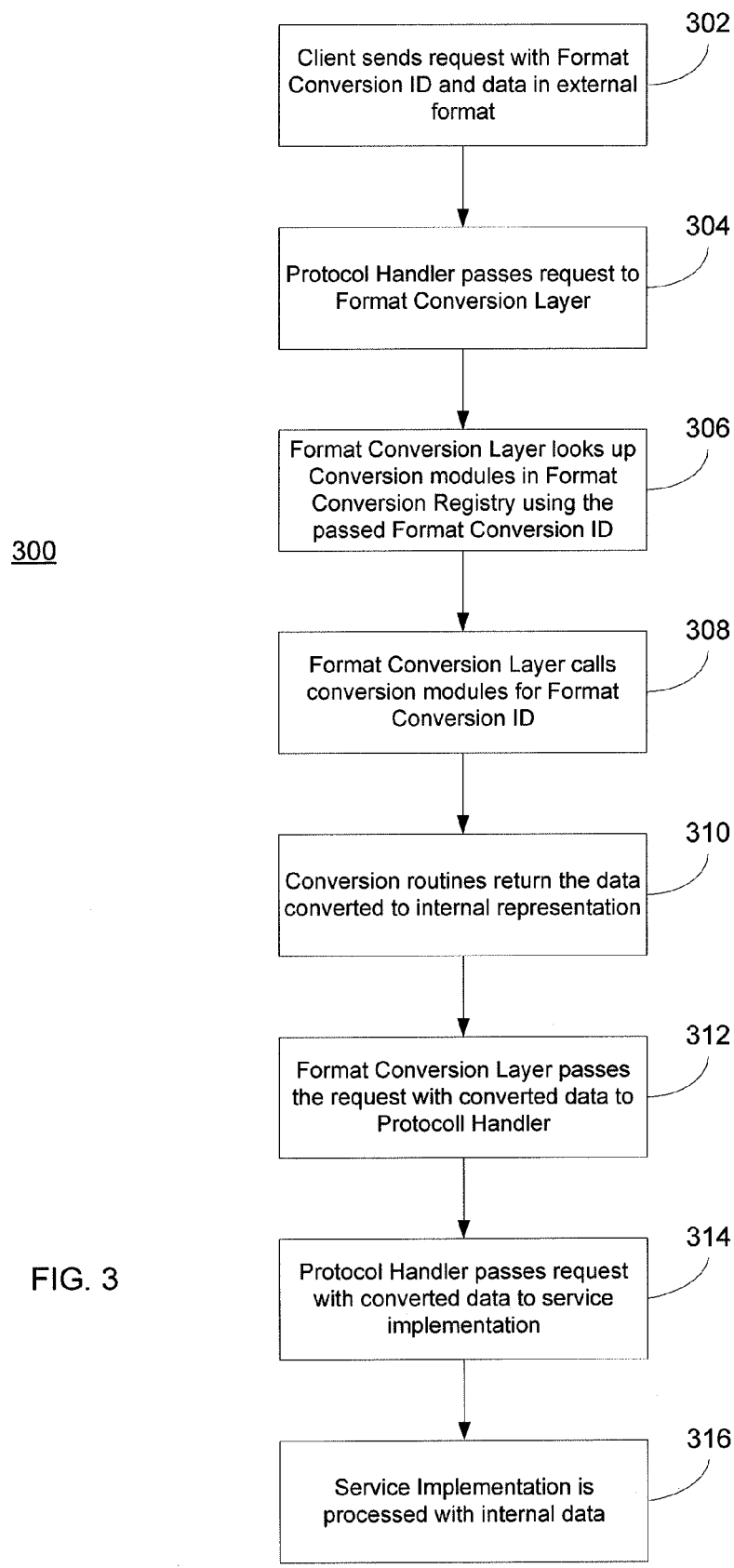
FIG. 3 is a process flow diagram illustrating aspects of a write access method having one or more features consistent with implementations of the current subject matter.

FIG. 3 is a flowchart of a write access process 300 in accordance with a parameter driven data format conversion method. At 302, a client sends request with a format conversion ID and data in an external format. At 304, the protocol handler passes the request to the format conversion layer. At 306, the format conversion layer looks up conversion modules in the format conversion registry using the passed format conversion ID. At 308, the format conversion layer calls the conversion modules for the format conversion ID.

At 310, conversion routines return the data converted to an internal representation, and at 312 the format conversion layer passes the request with the converted data to the protocol handler. At 314, the protocol handler passes the request with the converted data to the service implementation, and at 316 the service implementation is processed with internal data.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for parameter driven data format conversion in a client-server architecture comprising a server and a plurality of clients, the method comprising:
    providing a format conversion framework in a protocol layer between a client of the plurality of clients and the server;
    passing, by the format conversion framework from the client to the server, a format conversion identifier (ID) of a plurality of format conversion identifiers with a request from the client, each format conversion identifier being specific to a corresponding client of the plurality of clients;
    looking up a conversion module of a plurality of conversion modules by the format conversion framework based on the format conversion ID such that the looked-up conversion module is specific to the format conversion ID, the conversion module providing a corresponding conversion routine; and
    executing, by the format conversion framework, the corresponding conversion routine on a result returned from the server to the client based on the request, the corresponding conversion routine converting a format of the result into a format used by the client, the format used by the client being one of a rich site summary (RSS) format, an extensible markup language (XML) format, a javascript object notation (JSON) format, and an open data protocol (ODATA) format, the format used by the client being different from a format used by other one or more clients of the plurality of clients.

2. The method in accordance with claim 1, further comprising sending, to the client, the result in the format used by the client.

3. The method in accordance with claim 1, wherein looking up the conversion module includes accessing a format conversion registry.

4. The method in accordance with claim 1, wherein the conversion module is selected from the format conversion registry based on the format conversion ID.

5. The method in accordance with claim 4, wherein executing the corresponding conversion routine further comprises calling the corresponding conversion routine from the looked-up conversion module.

6. The method in accordance with claim 1, wherein passing the format conversion ID with the request further comprises passing the request through a protocol handler.

7. A system for parameter driven data format conversion in a client-server architecture comprising a server and a plurality of clients, the system comprising:
    a protocol handler at the server that handles a result from the server based on a request from a client of the plurality of clients, the result being provided according to a server protocol;
    a format conversion framework provided between the client and the server, the format conversion framework comprising:
        a format conversion registry that stores a plurality of conversion identifiers (IDs) that specifies a conversion routine needed for the request from the client, each conversion identifier associated with a corresponding conversion routine, at least one conversion identifier (ID) being passed from the client to the server;
        a format converter interface that calculates a format conversion registered according to one of the plurality of conversion identifiers; and
        a format converter handler communicating with the protocol handler to look up a conversion module from a plurality of conversion modules that specify executable conversion routines, the format converter handler executing the conversion routine from the conversion module on the result from the server needed for the request from the client, the converted result being in a format usable by the client, the format usable by the client comprising one of a rich site summary (RSS) format, a javascript object notation (JSON) format, and an open data protocol (ODATA) format, the format usable by the client being different from a format usable by other one or more clients of the plurality of clients.

8. The system in accordance with claim 7, wherein the format converter handler further sends, to the client, the result in the format used by the client.

9. The system in accordance with claim 7, wherein the conversion module is selected from the format conversion registry based on the format conversion ID.

10. A non-transitory computer-readable medium containing instructions to configure a processor to perform operations comprising:

providing a format conversion framework in a protocol layer between a client of a plurality of clients and a server connected in a client-server architecture;

passing, by the format conversion framework from the client to the server, a format conversion identifier (ID) of a plurality of format conversion identifiers with a request from the client, each format conversion identifier being specific to a corresponding client of the plurality of clients;

looking up a conversion module by the format conversion framework based on the format conversion ID, the conversion module providing a conversion routine; and executing, by the format conversion framework, the conversion routine on a result returned from the server to the client based on the request, the conversion routine converting a format of the result into a format used by the client, the format used by the client being one of a rich site summary (RSS) format, a javascript object notation (JSON) format, and an open data protocol (ODATA) format, the format used by the client being different from a format used by other one or more clients of the plurality of clients.

11. The computer-readable medium in accordance with claim 10, further comprising sending, to the client, the result in the format used by the client.

12. The computer-readable medium in accordance with claim 10, wherein looking up the conversion module includes accessing a format conversion registry.

13. The computer-readable medium in accordance with claim 10, wherein the conversion module is selected from the format conversion registry based on the format conversion ID.

14. The computer-readable medium in accordance with claim 13, wherein executing the conversion routine further comprises calling the conversion routine from the conversion module.

15. The computer-readable medium in accordance with claim 10, wherein passing the format conversion ID with the request further comprises passing the request.

* * * * *